3,124,155
COMPRESSOR HIGH-TO-LOW SIDE RELIEF VALVES

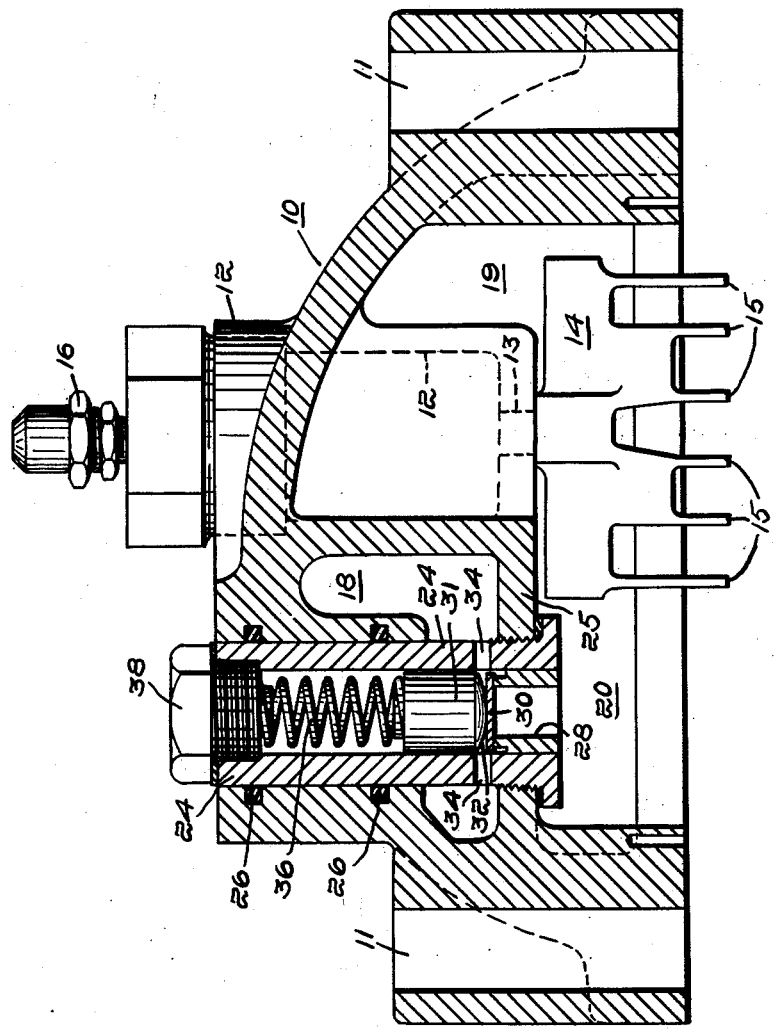

Erik H. Jensen, Staunton, Va., assignor to Westinghouse Electric Corporation, East Pittsburgh, Pa., a corporation of Pennsylvania
Filed July 24, 1961, Ser. No. 126,226
1 Claim. (Cl. 137—540)

This invention relates to gas compressors, and relates more particularly to high-to-low side, pressure relief valves for the cylinders of gas compressors.

Large refrigerant compressors of the reciprocating piston type are usually provided with relief valves for venting discharge gas into the suction sides of the compressors when the pressure of the discharge gas increases above normal. Such a valve usually consists of a valve cylinder with a bored seat, opening into the discharge side of a compressor cylinder, a piston which matches the valve cylinder and seat, a spring which holds the piston against its seat, and relief openings connecting the interior of the valve cylinder with the suction side of the compressor cylinder. Abnormal gas pressure unseats the piston and permits gas to flow through the relief openings. The manufacturing tolerances of prior such relief valves have resulted in such poor seatings of their pistons that continuous leakage of discharge gas has resulted with reduction in compressor efficiencies.

An object of this invention is to improve high-to-low side, pressure relief valves of gas compressors.

Another object of this invention is to provide a high-to-low side, pressure relief valve for a cylinder of a gas compressor in which the usual manufacturing tolerances do not affect the seating of the piston of the valve.

This invention will now be described with reference to the annexed drawing which is a side section of the head of a cylinder of a refrigerant compressor having a relief valve embodying this invention.

A conventional head casting 10 has bores 11 for receiving studs for bolting the casting to a compressor cylinder which is not shown, and has an unloader cylinder 12 with a piston rod 13 connected to a comb 14 having teeth 15 for holding open suction valve reeds in a valve plate which is not shown, when the compressor cylinder is to be unloaded. The unloader cylinder 12 has a fitting 16 in its head for connection to discharge gas which moves the piston of the unloader cylinder to unloader position. Passages 18 and 19 connect with the suction side of the compressor cylinder. Passage 20 connects with the discharge side of the compressor cylinder. A partition which is not shown, separates the passages 19 and 20.

The construction described in the foregoing in connection with the drawing is conventional. This invention adds in the space occupied by the prior high-to-low side, pressure relief valve, the valve which will now be described.

A relief valve cylinder 24 extends through a vertically extending, cylindrical opening in the casing 10 and has its lower end threaded in horizontal wall 25 of the casing. Seal rings 26 extend around the cylinder 24. A cylindrical seat insert 28 having a flat top, is forced fitted in the lower end of the cylinder 24. A flat, ground, metal disc 30 floats on the flat top of the insert 28. A piston 31 which is cylindrical except that its lower end is a downwardly-bulging dome 32 formed as a parti-spherical surface, is slidable in the cylinder 24. The dome 32 rests on the disc 30. Relief openings 34 extend through the wall of the cylinder 24 opposite the dome 32 and the disc 30, and connect the interior of the cylinder 24 with the suction passage 18. The passage within the insert 28 connects with the discharge gas passage 20. A coiled spring 36 extends within the cylinder 24, and is compressed between the top of the piston 31 and the bottom of a bolt 38 which is threaded into the top of the cylinder 24. The spring 36 urges the dome 32 of the piston 31 downwardly against the disc 30 for holding the latter seated on the top of the insert 28 when discharge gas pressures are less than a predetermined abnormally high pressure.

In operation, when the discharge gas pressure is abnormally high, the gas pressure against the bottom of the disc 30 lifts it off its seat on the top of the seat insert 28, permitting discharge gas to flow through the openings 34 and passages 18 and 19 to the suction side of the compressor. The free floating disc 30, and the dome 32 which contacts its upper side, cause the disc to find its proper position on its seat despite such cylinder, piston and seat misalignments as may result from the usual manufacturing tolerances. Thus, the floating disc and the domed piston provide proper seating under conditions which in the prior relief valves, resulted in continuous leakage when discharge gas pressures were not abnormally high.

The relief valve could be placed in any wall or partition which separates suction and discharge gas passages.

What is claimed is:

A gas pressure relief valve comprising a cylinder having a gas opening at one end and closed at the opposite end, means forming a seat for a valve disc in said cylinder adjacent to said open end, a flat valve disc normally seated on said seat, said disc having planar faces, one of said faces being normally in contact with said seat, a piston in said cylinder between said disc and said closed end, said piston having a domed surface in contact with the other one of said faces of said disc, said disc except for the contact of its said faces with said seat and said domed surface of said piston being freely floating, and a spring in said cylinder between said piston and said closed end for biasing said piston against said disc, said cylinder having a gas escape opening through its wall opposite said seat for permitting gas to pass from said cylinder when abnormal pressure in gas entering said one end unseats said disc.

References Cited in the file of this patent
UNITED STATES PATENTS

| | | |
|---|---|---|
| 1,735,490 | Barley | Nov. 12, 1929 |
| 2,264,136 | Karlberg | Nov. 25, 1941 |
| 2,740,425 | Garland | Apr. 3, 1956 |